(12) United States Patent
Moteki et al.

(10) Patent No.: US 9,841,508 B2
(45) Date of Patent: Dec. 12, 2017

(54) DOSE RATE MEASURING DEVICE

(71) Applicant: Mitsubishi Electric Corporation, Chiyoda-ku, Tokyo (JP)

(72) Inventors: Kenichi Moteki, Tokyo (JP); Toshihide Aiba, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/501,411

(22) PCT Filed: Aug. 26, 2014

(86) PCT No.: PCT/JP2014/072231
§ 371 (c)(1),
(2) Date: Feb. 2, 2017

(87) PCT Pub. No.: WO2016/030957
PCT Pub. Date: Mar. 3, 2016

(65) Prior Publication Data
US 2017/0219718 A1    Aug. 3, 2017

(51) Int. Cl.
*G01T 1/02* (2006.01)
*G01T 1/15* (2006.01)
(Continued)

(52) U.S. Cl.
CPC ............... *G01T 1/026* (2013.01); *G01T 1/023* (2013.01); *G01T 1/15* (2013.01); *G01T 1/1603* (2013.01); *G01T 1/201* (2013.01); *G01T 1/247* (2013.01)

(58) Field of Classification Search
CPC .................................. G01S 19/42; G01S 19/52
See application file for complete search history.

(56) References Cited

U.S. PATENT DOCUMENTS 4,880,981 A    11/1989  Johnston
4,973,913 A *  11/1990  Oda ........................ G01T 1/17
                                                          250/369
(Continued)

FOREIGN PATENT DOCUMENTS

JP        61-104282 A    5/1986
JP        1-250885 A    10/1989
(Continued)

OTHER PUBLICATIONS

International Search Report (PCT/ISA/210) dated Oct. 27, 2014, by the Japanese Patent Office as the International Searching Authority for International Application No. PCT/JP2014/072231.
(Continued)

*Primary Examiner* — Marcus Taningco
(74) *Attorney, Agent, or Firm* — Buchanan Ingersoll & Rooney PC

(57) ABSTRACT

Three semiconductor detectors are installed at positions where incidence of radiation on a scintillation detector is not blocked, at equal intervals centered on a central axis of the scintillation detector and at equal angles with respect to a plane which is at a right angle to the central axis. An energy compensation factor is determined on the basis of an average pulse height value obtained from a second pulse height spectrum obtained by analog voltage pulses which are output from these semiconductor detectors, and energy characteristics of a high-range dose rate obtained by a direct-current voltage which is output from the scintillation detector are compensated for.

9 Claims, 10 Drawing Sheets

(51) Int. Cl.
*G01T 1/16* (2006.01)
*G01T 1/20* (2006.01)
*G01T 1/24* (2006.01)

(56) References Cited

U.S. PATENT DOCUMENTS

| | | | |
|---|---|---|---|
| 2009/0080612 A1* | 3/2009 | Hikida | G01T 1/18 378/82 |
| 2011/0101234 A1* | 5/2011 | Nakamura | G01T 3/00 250/390.03 |
| 2013/0284926 A1* | 10/2013 | Aiba | G01T 1/17 250/336.1 |
| 2014/0312228 A1* | 10/2014 | Moteki | G01T 1/023 250/336.1 |
| 2015/0115165 A1* | 4/2015 | Tsuda | H01J 47/02 250/374 |
| 2015/0153461 A1* | 6/2015 | Aoki | G01T 1/244 250/370.07 |

FOREIGN PATENT DOCUMENTS

| | | |
|---|---|---|
| JP | 1-274095 A | 11/1989 |
| JP | 2002-168957 A | 6/2002 |
| JP | 2005-77230 A | 3/2005 |
| JP | 2012-7888 A | 1/2012 |
| JP | 2014-85183 A | 5/2014 |
| JP | 2014-122861 A | 7/2014 |

OTHER PUBLICATIONS

Written Opinion (PCT/ISA/237) dated Oct. 27, 2014, by the Japanese Patent Office as the International Searching Authority for International Application No. PCT/JP2014/072231.
Japanese Office Action dated Apr. 28, 2015 in Patent Application No. 2015-509251.

* cited by examiner

| AVERAGE PULSE HEIGHT VALUE PH | ENERGY COMPENSATION FACTOR $\beta$ |
|---|---|
| $PH\text{-}j$ | $\beta\text{-}j$ |
| $PH\text{-}j+1$ | $\beta\text{-}j+1$ |
| ⋮ | ⋮ |
| $PH_s$ | $\beta_s=1$ (CORRESPONDING TO Cs-137) |
| ⋮ | ⋮ |
| $PH_i-1$ | $\beta_i-1$ |
| $PH_i$ | $\beta_i$ |

| HIGH VOLTAGE VH | DARK CURRENT DOSE RATE D |
|---|---|
| $VH_{-j}$ | $D_{-j}$ |
| $VH_{-j+1}$ | $D_{-j+1}$ |
| ⋮ | ⋮ |
| $VH_s$ | $D_s$ (REFERENCE TEMPERATURE) |
| ⋮ | ⋮ |
| $VH_i - 1$ | $D_i - 1$ |
| $VH_i$ | $D_i$ |

DOSE RATE MEASURING DEVICE

Technical Field

The present invention relates to a dose rate measuring device which is installed in the vicinity of facilities such as a nuclear facility.

BACKGROUND ART

Hitherto, a plurality of dose rate measuring devices having sensitivity and accuracy depending on the level of radiation to be measured have been installed in the vicinities of facilities such as a nuclear facility and a spent nuclear fuel reprocessing facility, in order to measure a dose rate over a wide range from a natural radiation level to a high radiation level during an accident.

However, in a case where the plurality of dose rate measuring devices are installed close to each other, the devices may act as obstacles of radiation incidence with respect to each other. In addition, the plurality of dose rate measuring devices are prepared, and thus a problem of an increase in device cost occurs. For this reason, it is required to perform measurement corresponding to a wide range of close rate using a single dose rate measuring device, For such a request, PTL 1 discloses a dose rate measuring device in which a thallium-activated sodium iodide scintillation detector is provided with a lead shield, and methods of measuring a dose rate in accordance with the level of a dose rate in a measurement field are automatically switched.

In such a dose rate measuring device, a pulse height discrimination bias modulation (DBM) method is adopted for the measurement of a dose rate in a low dose rate region (hereinafter, called a low-range dose rate), and a current measurement method is adopted for the measurement of a dose rate in a high dose rate region (hereinafter, called a high-range dose rate).

The DBM method is to convert a current pulse which is output by a scintillation detector into an analog voltage pulse to amplify the converted pulse and remove high-frequency noise, to weight the pulse with a dose rate in a DBM circuit to set the weighted pulse to a pulse of a repetitive frequency proportional to the dose rate, and to calculate the low-range dose rate on the basis of this pulse.

In addition, the current measurement method is to input a direct current which is output by a scintillation detector to a voltage/frequency converter to set the input current to a pulse of a repetitive frequency proportional to a voltage, and to calculate the high-range dose rate on the basis of this pulse.

Energy characteristics as an error generated depending on energy of a γ-ray are different from each other in the low-range dose rate and the high-range dose rate, and optimum switching points of the low-range dose rate and the high-range dose rate are different from each other depending on energy of γ-ray. Therefore, in a case where two measurement methods are switched with a fixed dose rate, a stepped difference between output energy characteristics occurs in the switching point. On the other hand, in PTL 1, the detector is provided with the lead shield, and thus the stepped difference is reduced.

CITATION LIST

Patent Literature

[PTL 1] JP-A-61-104282

SUMMARY OF INVENTION

Technical Problem

In the dose rate measuring device disclosed in PTL 1, the thallium-activated sodium iodide scintillation detector is provided with the lead shield, and thus both an error due to the energy characteristics of a high dose rate region and a stepped difference occurring in the switching point can be suppressed to some extent, but on the other hand, a problem of a deterioration in original output energy characteristics of the low-range dose rate has occurred.

In this manner, in a case where measurement corresponding to a wide range of dose rate is performed in a single dose rate measuring device, it is difficult to obtain satisfactory output energy characteristics throughout the entire energy of radiation to be measured, and satisfactory energy characteristics by suppressing a stepped difference between the switching points of the low-range dose rate and the high-range dose rate, and thus realizing this circumstances has been a problem.

The invention is contrived in view of the above problem, and an object thereof is to obtain a dose rate measuring device in which output energy characteristics are satisfactory throughout the entire energy of radiation to be measured, linearity is satisfactory in the entire measurement region, and a stepped difference between switching points is suppressed.

Solution to Problem

According to the invention, there is provided a dose rate measuring device including: a detection unit including first radiation detector for detecting radiation and outputting an analog voltage pulse and a direct-current voltage, and second radiation detector for detecting radiation in three or more sensor units and outputting analog voltage pulses; and a measurement unit including a calculator to convert a first pulse height spectrum, obtained by the analog voltage pulse which is output from the first radiation detector, into a low-range dose rate, and to convert the direct-current voltage, which is output from the first radiation detector, into a high-range dose rate, and to determine an energy compensation factor for the high-range dose rate on the basis of an average pulse height value obtained from a second pulse height spectrum obtained by the analog voltage pulses which are output from the second radiation detector, and to multiply the high-range dose rate by the energy compensation factor, and to compensate for energy characteristics of the high-range dose rate, wherein the respective sensor units of the second radiation detector are installed at positions where incidence of radiation on the first radiation detector is not blocked, at equal intervals centered on a central axis of the first radiation detector and at equal angles with respect to a plane which is at a right angle to the central axis, and are disposed so that a sum of areas seen through sensitive surfaces of the respective sensor units from a direction parallel to the central axis, and areas seen through the sensitive surfaces of the respective sensor units from a direction at a right angle to the central axis become equal to each other.

Advantageous Effects of Invention

According to the dose rate measuring device of the invention, the energy compensation factor is determined on the basis of the average pulse height value obtained from the second pulse height spectrum obtained by the analog voltage pulses which are output from the second radiation detection means including three or more sensor units, and the energy characteristics of the high-range dose rate obtained by the direct-current voltage which is output from the first radiation detection means are compensated for. Therefore, it is possible to obtain a dose rate measuring device in which output energy characteristics are satisfactory throughout the entire energy of radiation to be measured, linearity is satisfactory in the entire measurement range, and a stepped difference between switching points is suppressed.

Objects, features, viewpoints, and effects of the invention other than those stated above will be made clearer from the following description of the invention referring to the drawings.

DESCRIPTION OF EMBODIMENTS

Embodiment 1

Figure 1:
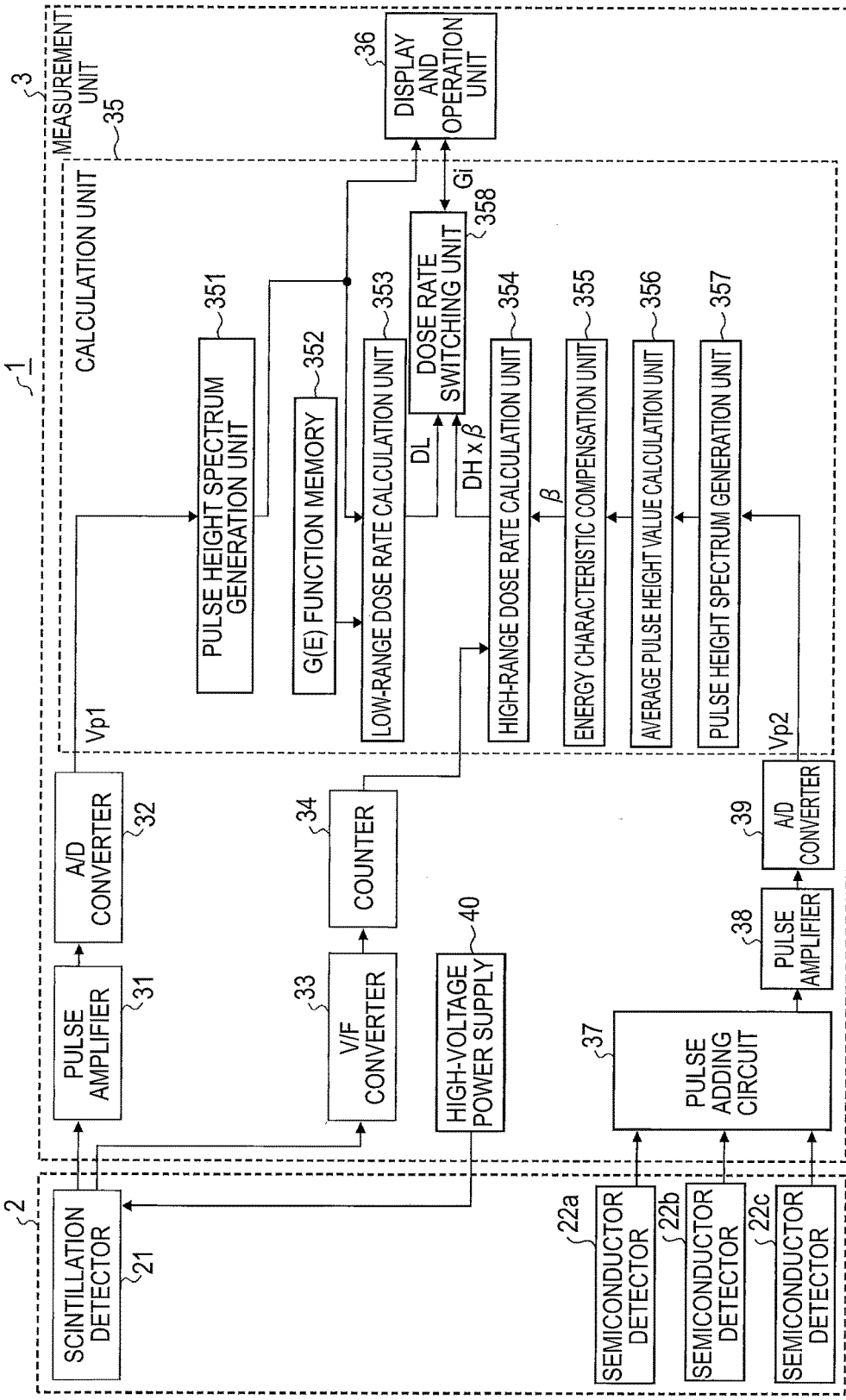
FIG. 1 is a diagram illustrating the entire configuration of a dose rate measuring device according to Embodiment 1 of the invention.
Figure 2:
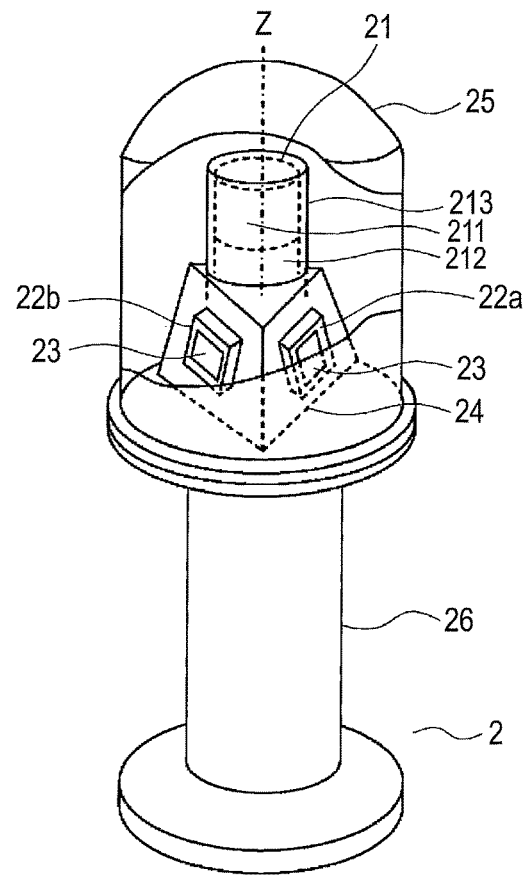
FIG. 2 is a diagram illustrating a detection unit of the dose rate measuring device according to Embodiment 1 of the invention.

Hereinafter, a dose rate measuring device according to Embodiment 1 of the invention will be described with reference to the accompanying drawings. FIG. 1 shows the entire configuration of the dose rate measuring device according to Embodiment 1, and FIG. 2 shows a detection unit of the dose rate measuring device according to Embodiment 1. In the respective drawings which are used in the following description, the same or equivalent portions in the drawings are denoted by the same reference numerals and signs.

A detection unit 2 of a dose rate measuring device 1 includes first radiation detector for detecting radiation to output an analog voltage pulse and a direct-current voltage, and second radiation detector for detecting radiation in three or more sensor units to output an analog voltage pulse.

In Embodiment 1, as shown in FIG. 1, a scintillation detector 21 is included as the first radiation detector, and three semiconductor detectors 22a, 22b, and 22c are included as the second radiation detector. In the following description, in a case where three semiconductor detectors 22a, 22b, and 22c are not required to be particularly distinguished from each other, these semiconductor defectors are referred to as the semiconductor detector 22 collectively.

An inorganic scintillation detector, a plastic scintillation detector, or the like is used in the scintillation detector 21. In Embodiment 1,a thallium-activated, sodium iodide (hereinafter, referred to as NaI(TI)) scintillation detector representing an inorganic scintillation detector is used.

The scintillation detector 21 outputs a discrete analog voltage pulse having a voltage which is directly proportional to energy of radiation absorbed by a NaI (Tl) scintillator in a low dose rate region, and outputs a direct-current voltage which is directly proportional to the absorbed energy of radiation in a high dose rate region.

In addition, for example, a Si-PIN photodiode detector is used in the semiconductor detector 22. The semiconductor detector 22 includes a semiconductor sensor as a sensor unit, absorbs energy of radiation incident on each sensor unit, and outputs a discrete analog voltage pulse having a voltage which is directly proportional to the absorbed energy.

When the semiconductor detector 22 is selected, regarding the repetitive frequency of the analog voltage pulse to be output, fluctuation increases in a case where a counting rate is excessively small near the lower limit of a high-range dose rate, and pile-up of the analog voltage pulse occurs in a case where a counting rate is excessively large near the upper limit of the high-range dose rate, which leads to a decrease in the accuracy of an energy compensation factor. Therefore, a semiconductor detector having detection efficiency suitable to a high dose rate region is selected.

A measurement unit 3 of the dose rate measuring device 1 includes a pulse amplifier 31, an analog/digital converter 32 (hereinafter, referred to as an A/D converter 32), and a pulse height spectrum generation unit 351 of a calculation unit 35 as the calculator, as means for obtaining a first pulse height spectrum by an analog voltage pulse which is output from the scintillation detector 21.

The pulse amplifier 31 amplifies the analog voltage pulse which is output from the scintillation detector 21, and removes superimposed high-frequency noise. The A/D converter 32 measures a pulse height value Vp1 from the analog voltage pulse amplified by the pulse amplifier 31. The pulse height spectrum generation unit 351 generates and outputs the first pulse height spectrum on the basis of the pulse height value Vp1 which is output from the A/D converter 32.

In addition, the calculation unit 35 of the measurement unit 3 includes a G(E) function memory 352 and a low-range dose rate calculation unit 353, as low-range dose rate calculation means for converting the first pulse height spectrum into a low-range dose rate DL.

The G(E) function memory 352 has a table called a G(E) function stored therein, in which, for example, a measured energy range of 50 keV to 3,000 keV is divided into channels of 10 ch to 600 ch, and each channel (ch(i)) and a dose rate Gi (nGy·h$^{-1}$/cpm) per unit counting rate are associated with each other.

The low-range dose rate calculation unit 353 uses the table stored in the G(E) function memory 352, to divide a fixed period time into ΣGi·Ni obtained by integrating the product of a count Ni and a dose rate Gi per unit counting rate of each channel measured in a fixed period on the basis of spectrum data of the first pulse height spectrum which is output from the pulse height spectrum generation unit 351, and to set the resultant to a dose rate in the calculation period. Further, an average dose rate is obtained by performing a moving average on the latest data string of the dose rate for a measurement time, and is output as the low-range dose rate DL.

In addition, the measurement unit 3 includes a voltage/frequency converter 33 (hereinafter, referred to as a V/F converter 33), a counter 34, and a high-range dose rate calculation unit 354 of the calculation unit 35, as high-range dose rate calculation means for converting the direct-current voltage -which is output from the scintillation detector 21 into a high-range dose rate DH.

The V/F converter 33 converts the direct-current voltage which is output from the scintillation detector 21 into a digital pulse of a repetitive frequency which is directly proportional to the voltage value. The counter 34 outputs a count value Ni obtained by counting the digital pulse which is output from the V/F converter 33 over a fixed period.

The high-range dose rate calculation unit 354 multiplies a counting rate, obtained by dividing a fixed period time into the count value which is output from the counter 34, by a dose rate conversion factor η, to set the resultant to a dose rate in the calculation period. Further, an average dose rate is obtained by performing a moving average on the latest data string of the dose rate for a measurement time, to set the resultant to the high-range dose rate DH.

In addition, the measurement unit 3 includes a pulse adding circuit 37, a pulse amplifier 38, an analog/digital converter 39 (hereinafter, referred to as an A/D converter 39), and a pulse height spectrum generation unit 357 of the calculation unit 35, as means for obtaining a second pulse height spectrum by an analog voltage pulse which is output from the semiconductor detector 22.

The pulse adding circuit 37 adds and synthesizes an analog voltage pulse which is output from each of the semiconductor detectors 22a, 22b, and 22c, to set the analog voltage pulse to a series of analog voltage pulse strings. The pulse amplifier 38 amplifies the analog voltage pulse which is output from the pulse adding circuit 37 and removes superimposed high-frequency noise.

The A/D converter 39 measures a pulse height value Vp2 from the analog voltage pulse amplified by the pulse amplifier 38. The pulse height spectrum generation unit 357 generates and outputs the second pulse height spectrum on the basis of the pulse height value Vp2 which is output from the A/D converter 39.

Further, the measurement unit 3 includes an average pulse height value calculation unit 356 and an energy characteristic compensation unit 355, as energy compensation factor determination means for determining an energy compensation factor for the high-range dose rate DH on the basis of an average pulse height value obtained from the second pulse height spectrum.

The average pulse height value calculation unit 356 obtains a fixed period average pulse height value in the fixed period on the basis of the second pulse height spectrum, and outputs an average pulse height value obtained by performing a moving average on the latest data string of the fixed period average pulse height value for a measurement time.

A correspondence table (see FIG. 4) of a well-known average pulse height value PH of radiation of energy created on the basis of a type test and an energy compensation factor β is stored in the energy characteristic compensation unit 355. The energy characteristic compensation unit 355 collates the average pulse height value acquired from the average pulse height value calculation unit 356 with the correspondence table, and outputs a corresponding energy compensation factor.

The high-range dose rate calculation unit 354 having acquired an energy compensation factor from the energy characteristic compensation unit 355 multiplies a high-range dose rate by the energy compensation factor, and outputs a high-range dose rate (DH×β) obtained by compensating for energy characteristics.

In addition, the measurement unit 3 includes a dose rate switching unit 358 which is dose rate switching means for obtaining a ratio of the high-range dose rate obtained by compensating for energy characteristics to the low-range dose rate, and switching and outputting the low-range dose rate and the high-range dose rate obtained by compensating for the energy characteristics on the basis of the ratio and the high-range dose rate obtained by compensating for energy characteristics. The dose rate switching unit 358 switches the output from the low-range dose rate to the high-range dose rate, or from the high-range dose rate to the low-range dose rate, on the basis of a ratio (DH×β)/DL of the high-range dose rate on which energy compensation is performed to the low-range dose rate.

Figure 6:
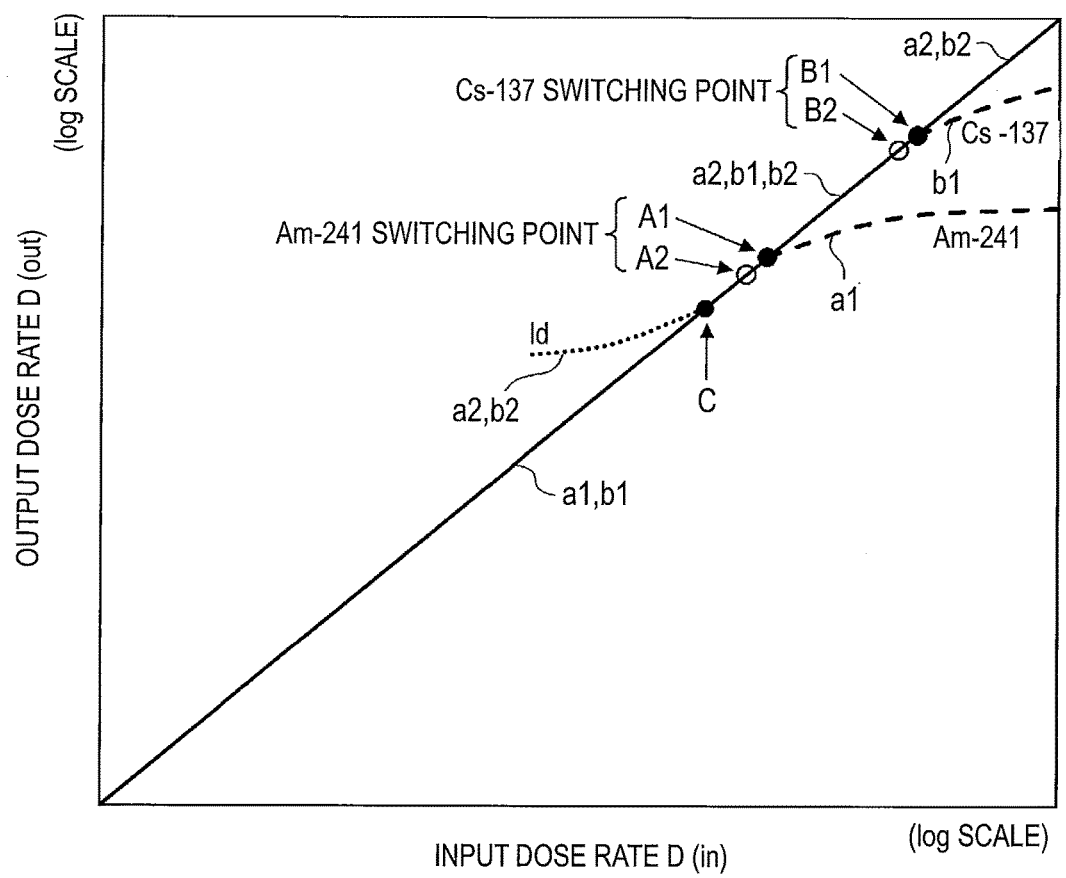
FIG. 6 is a diagram illustrating a relationship between an input dose rate of radiation and an optimum switching point in the dose rate measuring device according to Embodiment 1 of the invention.

A switching method of the dose rate switching unit 358 will be simply described (see FIG. 6). When (DH×β)/DL is set to be equal to or greater than a setting point A1 in a case of a rise in dose rate under the condition that the high-range dose rate (DH×β) is equal to or greater than a setting value C, the dose rate is output by switching from low-range dose rate to the high-range dose rate on which energy compensation is performed. On the other hand, when (DM×β)/DL is set to be equal to or less than a setting point A2 under the condition that the high-range dose rate (DH×β) is equal to or greater than the setting value C in a case of a drop in dose rate, the dose rate is output by switching from the high-range dose rate on which energy compensation is performed to the low-range dose rate. The setting points A1 and A2 are provided with hysteresis of A1>A2. The same is true of setting points B1 and B2.

In addition, the measurement unit 3 includes a display and operation unit 36 that displays a dose rate which is output from, the dose rate switching unit 358 and performs an operation of setting or the like of each unit, and a high-voltage power supply 40 that supplies a high voltage for bringing the scintillation detector 21 into operation. The display and operation unit 36 displays a pulse height spectrum which is output from the pulse height spectrum generation unit 351 through a manual operation. Thereby, an operator can confirm the presence of a nuclide of interest. The setting of a high voltage which is supplied from the high-voltage power supply 40 to the scintillation detector 21 is performed in the display and operation unit 36.

Next, the disposition of each component of the detection unit 2 will be described with reference to FIGS. 2 and 3. The scintillation detector 21 is configured such that a cylindrical scintillator 211 that absorbs energy of radiation to emit fluorescence, a photomultiplier tube 212 that converts the fluorescence into electrons to multiply the converted electrons and convert the multiplied electrons into an analog current pulse, a function unit (not shown) that converts the analog current pulse into an analog voltage pulse, and a function unit (not shown) that converts the analog current pulse into a direct-current voltage are disposed in order from above, in FIG. 2. These function units are installed within a detector case 213 passing through a trestle 24.

On the other hand, each of the semiconductor detectors 22a and 22b is attached to the lateral side of the trestle 24, with the semiconductor sensor covered with a filter plate 23. The trestle 24 has a shape having the upper portion of a triangular pyramid cut, and the inside thereof is hollow. The semiconductor detector 22c which is not shown is attached to the lateral side of the trestle 24 on the rear surface side.

The semiconductor detector 22 is installed at a position where the incidence of radiation on the scintillator 211 of the scintillation detector 21 is not blocked. In addition, each semiconductor sensor of the semi conductor detector 22 attached to the trestle 24 is installed at equal intervals centered on a central axis Z of the scintillation detector 21, and at equal angles with respect to a plane which is at a right angle to the central axis Z.

A detection unit overcoat 25 contains the scintillation detector 21, the semiconductor detector 22, and the trestle 24 therein, and shields light. In addition, in a case where the detection unit 2 is installed outdoors, the detection unit overcoat 25 has a waterproof structure in which the outside air is cut off. A stand 26 supports the detection unit overcoat 25 and devices contained in the overcoat, and holds the scintillation detector 21 to a fixed height.

Figure 3:
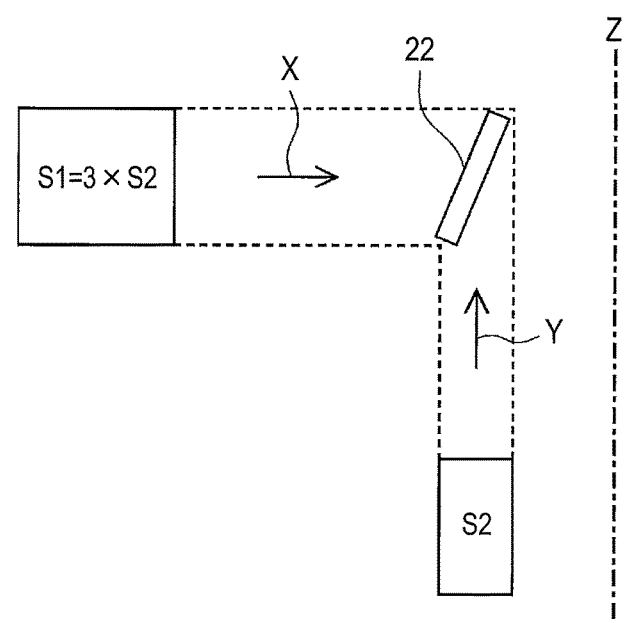
FIG. 3 is a diagram illustrating an effective area for a measurement space of a semiconductor detector according to Embodiment 1 of the invention.

In addition, as shown in FIG. 3, the semiconductor detector 22 is configured such that each sensor unit is disposed so that the sum (3×S2) of areas S2 seen through sensitive surfaces of each sensor unit from a direction (arrow Y in the drawing) parallel to the central axis Z and an area S1 seen through the sensitive surface of each sensor unit from a direction (arrow X in the drawing) at a right angle to the central axis Z become equal (S1=3×S2) to each other.

With such a disposition, the directional dependence of sensitivity of the semiconductor detector 22 on a measurement space is suppressed. That is, the correlation of average energy of radiation of a measurement space in a high dose rate region with an average pulse height value obtained by synthesizing the outputs of the semiconductor detector 22 is not influenced by the incident direction of radiation. The angle of each sensor unit of the semiconductor detector 22 with respect to the central axis Z is minutely adjusted by an experiment, and thus it is possible to further reduce the directional dependence of sensitivity of the semiconductor detector 22.

Figures 4, 5:
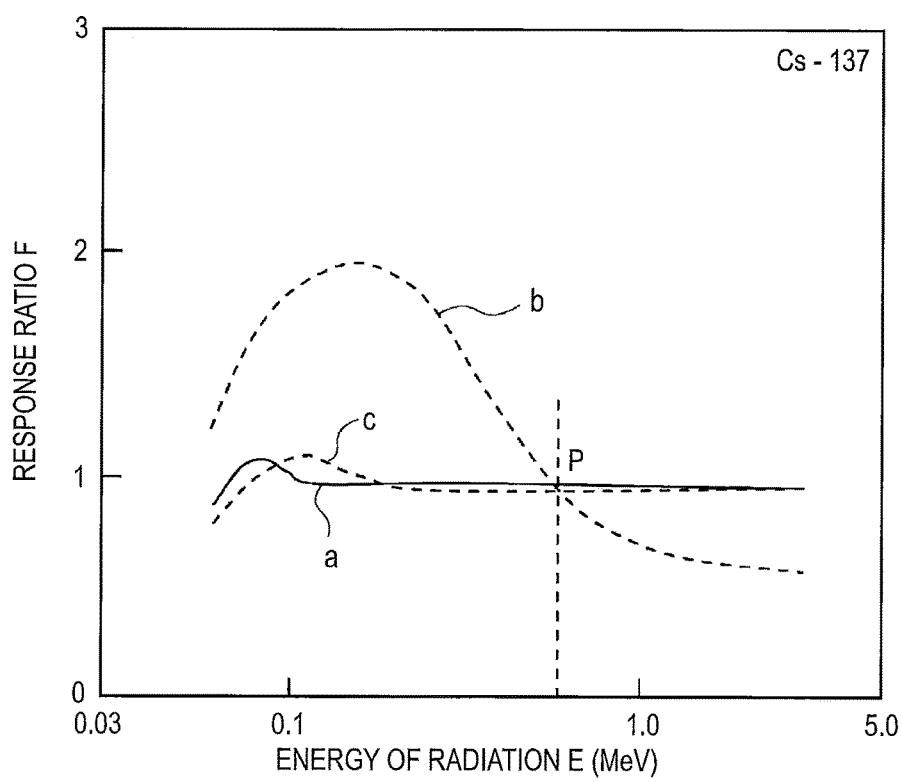
FIG. 4 is a diagram illustrating a correspondence table between an average pulse height value and an energy compensation factor of the semiconductor detector according to Embodiment 1 of the invention.
FIG. 5 is a diagram illustrating energy characteristics of a low-range dose rate and a high-range dose rate in the dose rate measuring device according to Embodiment 1 of the invention.

FIG. 4 shows a correspondence table of the average pulse height value PH of the semiconductor detector 22 and the energy compensation factor $\beta$. The energy compensation factor is a factor for correcting distortion of the energy characteristics of the high-range dose rate obtained by the direct-current voltage which is output from the scintillation detector 21, and is obtained from the correlation of the average energy of radiation of a measurement space in a high dose rate region and the average pulse height value of the semiconductor detector 22. The energy characteristic compensation unit 355 determines an energy compensation factor corresponding to the average pulse height value, with reference to the table shown in FIG. 4.

In the example shown in FIG. 4, an energy correction factor $\beta s$ for an average pulse height value PHs of Cs (cesium)-137 is set to 1, and the energy compensation factor $\beta$ for other average pulse height values PH is shown at a $\beta s$ relative ratio. A measured energy range is set to 50 keV to 3,000 keV similarly to that of a general dose rate measuring device, and the average pulse height value and the energy compensation factor are obtained by an experiment in the upper limit and lower limit, and a plurality of points divided therebetween. Regarding a point difficult to perform an experiment, the average pulse height value and the energy compensation factor are obtained by analysis.

The lower limit of 50 keV of the measured energy range is set so as to be capable of substantially measuring γ-ray 81 keV of Xe-133. In the lower limit of the energy compensation factor, a spectrum of X-ray 80 keV or γ-ray 60 keV (effective energy 57 keV) of Am-241 may be measured, and a corresponding energy compensation factor may obtained.

As described above, in Embodiment 1, a satisfactory correlation with the average energy of a measurement space is obtained in the average pulse height value obtained from the spectrum of analog voltage pulses which are output from the semiconductor detectors 22. Therefore, it is possible to perform high-accuracy measurement by compensating for the energy characteristics of the high-range dose rate by the table of the energy compensation factor corresponding to the average pulse height value shown in FIG. 4.

In addition, the semiconductor detector 22 is provided with the filter plate 23, and thus the counting rate of a pulse string of an analog voltage pulse is attenuated so as to be approximately proportional to a dose rate without depending on energy of radiation. Thereby, the ratio of counting efficiency to the dose rate of a measurement space is set to have a suitable value. Thereby, pile-up of pulses in a high dose rate region is suppressed, and a decrease in accuracy due to an excessively small counting rate in a low counting rate region is suppressed.

Next, the compensation of energy characteristics for the high-range dose rate in the energy characteristic compensation unit 355 will be described. FIG. 5 is a diagram illustrating the energy characteristics of a low-range dose rate and a high-range dose rate in the dose rate measuring device 1 according to Embodiment 1, and shows a response ratio of other energy when the response of the low-range dose rate for the incidence of energy 662 keV of a γ-ray of Cs-137 is set to 1.

In FIG. 5, the horizontal axis represents energy of radiation E (MeV), and the vertical axis represents a response rate F of the dose rate measuring device 1 when a P point is set to a reference value of 1. In addition, in FIG. 5, a solid line shown by a is the energy characteristics of the low-range dose rate, a dotted line shown by b is the energy characteristics of the high-range dose rate before compensation, and a dotted line shown by c is the energy characteristics of the high-range dose rate after compensation.

As shown in FIG. 5, in the energy characteristics a of the low-range dose rate, satisfactory energy characteristics are obtained in a low-energy region by causing a pulse height spectrum to finely correspond to a dose rate using a G(E) function.

On the other hand, in the energy characteristics b of the high-range dose rate before compensation, large distortion is present particularly in a low-energy region, but in the energy characteristics c after compensation, satisfactory energy characteristics are obtained. As a result, satisfactory output energy characteristics are obtained throughout the entire energy of radiation to be measured.

In FIG. 5, since a representative value is used as an energy compensation factor corresponding to each energy, slight distortion remains in the energy characteristics c of the high-range dose rate after compensation due to an instrumental error. The distortion due to such an instrumental error is theoretically eliminated by preparing the table shown in FIG. 4 for individual detectors, but this is not realistic, and thus a representative value is used.

Next, the setting of switching points of the low-range dose rate and the high-range dose rate in the dose rate switching unit 358 will be described. The dose rate switching unit 358 searches for an optimum switching point on the basis of the ratio of the low-range dose rate which is output from the low-range dose rate calculation unit 353 to the high-range dose rate which is output from the high-range dose rate calculation unit 354, and executes switching.

Switching from the low-range dose rate DL to the high-range dose rate DH is executed when (DH×β)/DL exceeds 1+k1, and switching from the high-range dose rate DH to the low-range dose rate DL is executed when (DH×β)/DL drops to 1+k2.

When switching points during rise and drop axe made to be the same as each other, a dose rate is hunted in case of fluctuation due to remaining in the vicinity of the switching point, and an operation or indication becomes unstable. For this reason, a hysteresis is properly held with the relation of k1>k2. Here, k1 and k2 are set to have positive (+) values so that a stepped difference between the switching points is set to be within a range of accuracy, and that a switching operation is reliably performed during a sudden rise response.

FIG. 6 shows a relationship between an optimum switching point and an input dose rate and an output dose rate of radiation in the dose rate measuring device 1 according to Embodiment 1. In FIG. 6, the horizontal axis is an input dose rate D(in) (μGy/h), the vertical axis is an output dose rate D(out) (μGy/h), and a1 and a2 conceptually show the input and output response characteristics of a dose rate of effective energy 57 keV of Am(americium)-241.

In addition, b1 and b2 conceptually show the input and output response characteristics of a dose rate of effective energy 660 keV of Cs-137, and have shapes of a linear shift by an approximately single digit to the high dose rate side with respect to the characteristics of Am-241.

In addition, a1 is input and output response characteristics based on the low-range dose rate calculation unit 353, the low dose rate side has satisfactory linearity, and the high dose rate side has a drop tendency (broken line of Am-241) subsequently to saturation. In addition, a2 is input and output response characteristics based on the high-range dose rate calculation unit 354, and a dark current Id (dotted line) of the scintillation detector 21 is dominant on the low dose rate side, but satisfactory linearity is shown with an increase in input dose rate.

Similarly, b1 is the input and output response characteristics based on the low-range dose rate calculation unit 353, the low dose rate side has satisfactory linearity, and the high dose rate side has a drop tendency (broken line of Cs-137) subsequently to saturation. In addition, b2 is input and output response characteristics based on the high-range dose rate calculation unit 354, and the dark current Id of the scintillation detector 21 is dominant on the low dose rate side, but satisfactory linearity is shown with an increase in input dose rate.

In FIG. 6, A1 indicates a switching point at which (DH×α)/DL is 1+k1, and A2 indicates a switching point at which (DH×β)/DL is 1+k2. In consideration of the dark current Id, A1 and A2 are set to dose rates in which the influence is reduced. Similarly, B1 indicates a switching point at which (DH×β)/DL is 1+k1, and B2 indicates a switching point at which (DH×β)/DL is 1+k2.

As described above, according to the dose rate measuring device 1 of Embodiment 1, an energy compensation factor is determined on the basis of the average pulse height value obtained from the second pulse height spectrum obtained by the analog voltage pulses which are output from three semiconductor detectors 22, and the energy characteristics of the high-range dose rate obtained by the direct-current voltage which is output from the scintillation detector 21 is compensated for. In addition, the switching points of the low-range dose rate and the high-range dose rate are automatically determined on the basis of the ratio of (DH×β)/DL, under the condition of a dose rate (setting point C in FIG. 6) or greater in which the influence of the dark current Id is reduced. Therefore, output energy characteristics are satisfactory throughout the entire energy of radiation to be measured, linearity is satisfactory in the entire measurement range, and a stepped difference between the switching points is suppressed, thereby allowing measurement corresponding to a wide range of dose rate to be performed with a high degree of accuracy, Further, the first pulse height spectrum obtained by the analog voltage pulse which is output from the scintillation detector 21 can be displayed, as necessary, on the display and operation unit 36. Therefore, it is possible to ascertain the presence of nuclides of Cs-134 and Cs-137 over a long period of time during the occurrence of a facility accident.

Embodiment 2

Figure 7:
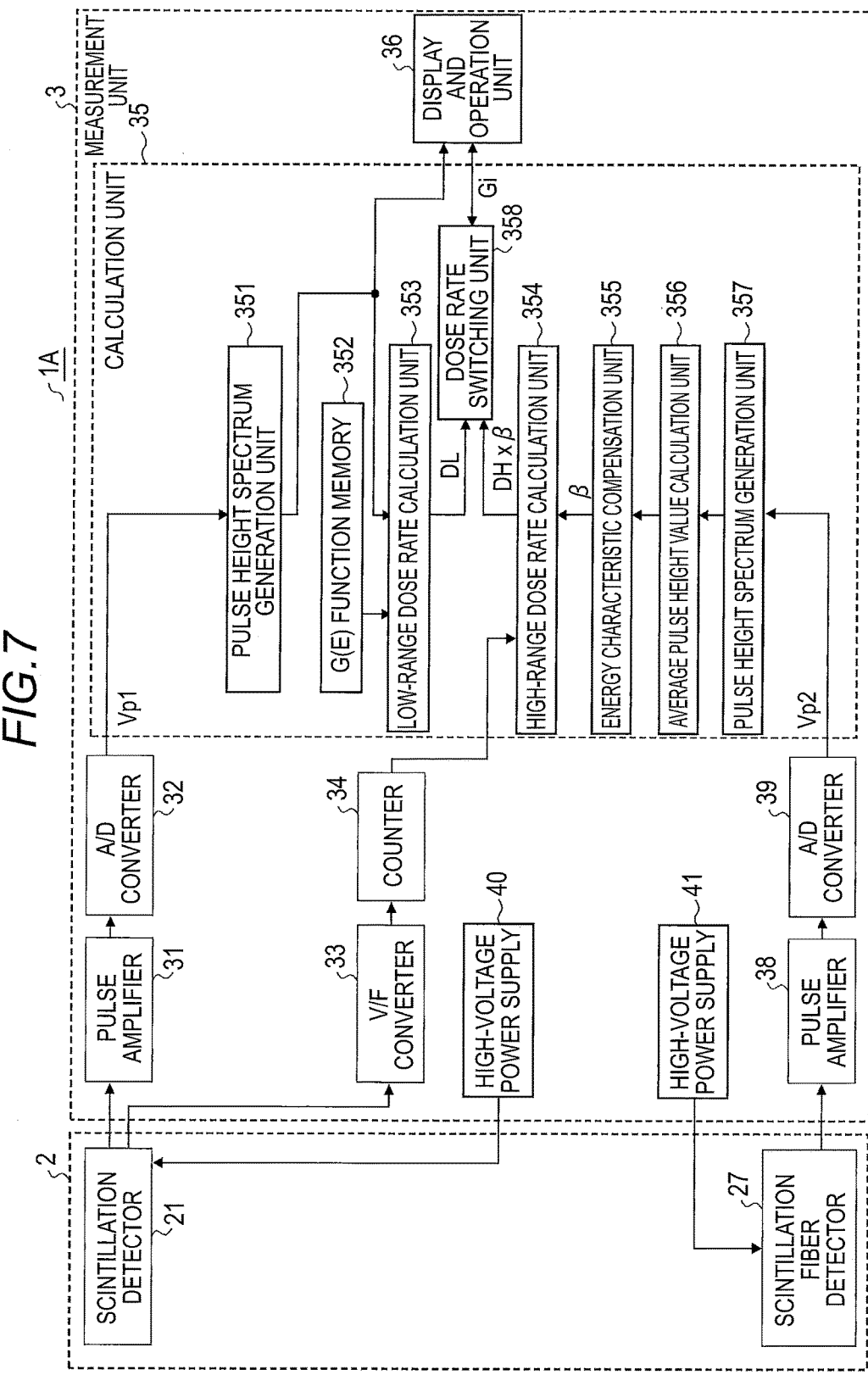
FIG. 7 is a diagram illustrating the entire configuration of a dose rate measuring device according to Embodiment 2 of the invention.

The entire configuration of a dose rate measuring device according to Embodiment 2 of the invention is shown in FIG. 7. In FIG. 7, the same or equivalent portions as those in FIG. 1 are denoted by the same reference numerals and signs, and thus the description thereof will not be given. In Embodiment 1, three semiconductor detectors 22a, 22b, and 22c are used as the second radiation detector, but in Embodiment 2, one scintillation fiber detector 27 is used. In addition, the measurement unit 3 includes a high-voltage power supply 41 that supplies a high voltage for bringing the scintillation fiber detector 27 into operation.

Figure 8:
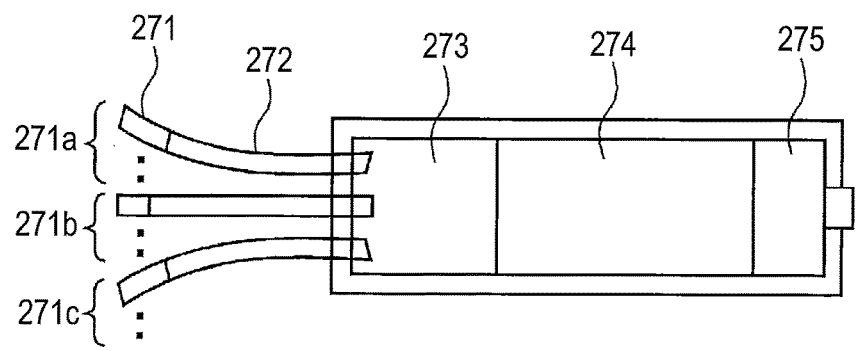
FIG. 8 is a diagram illustrating a scintillation fiber detector of the dose rate measuring device according to Embodiment 2 of the invention.

FIG. 8 shows the scintillation fiber detector 27 of a dose rate measuring device 1A according to Embodiment 2. The scintillation fiber detector 27 includes three band-like scintillation fibers 241a, 271b, and 271c by dividing a plurality of scintillation fibers which are sensor units into three. In the following description, in a case where the three scintillation fibers 271a, 271b, and 271c are not required to be particularly distinguished from each other, these scintillation fibers are referred to as the scintillation fiber 271 collectively.

As shown in FIG. 8, an optical fiber 272 is connected to each of the scintillation fibers 271. The optical fiber 272 is inserted into a hole of the end face of a light guide 273 and is optically bonded thereto. The light guide 273 is optically bonded to a photomultiplier tube 274. The scintillation fiber 271 emits fluorescence having the amount of light which is directly proportional to absorbed energy of radiation. The photomultiplier tube 274 converts the fluorescence into electrons, multiplies the converted electrons, and outputs a current pulse having the amount of charge which is directly proportional to the amount of light.

A distribution circuit 275 divides a high voltage supplied from the high-voltage power supply 41 of the measurement unit 3, and distributes the divided high voltage as a bias in order to bring the photomultiplier tube 274 into operation. The current pulse which is output from the photomultiplier tube 274 is input to the pulse amplifier 30 of the measurement unit 3 through a pre-amplifier 276 (see FIG. 3).

Figure 9:
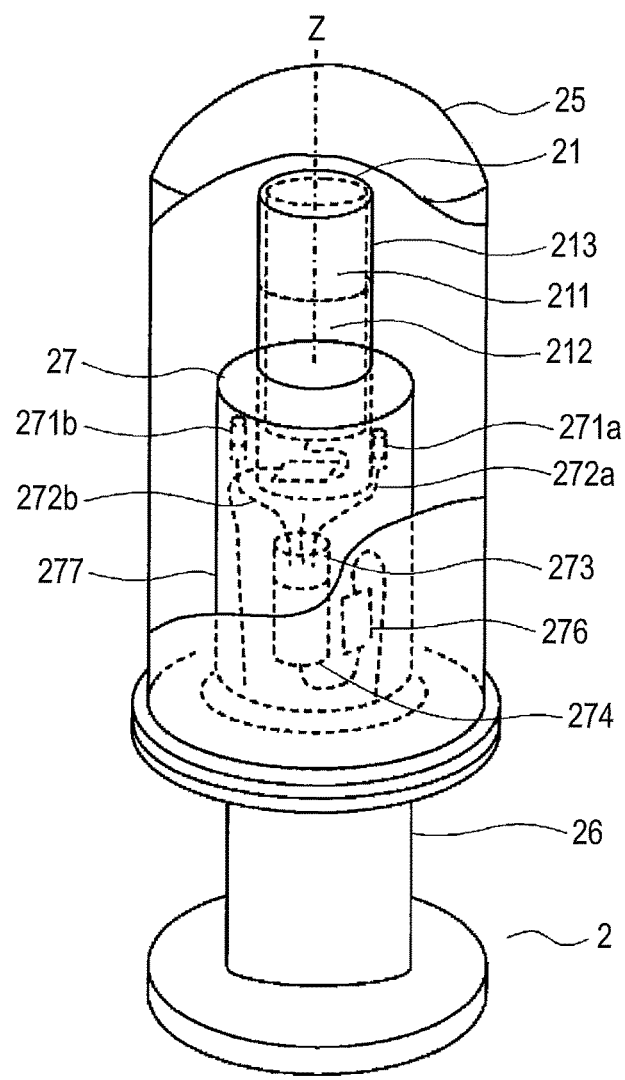
FIG. 9 is a diagram illustrating a detection unit of the dose rate measuring device according to Embodiment 2 of the invention.

FIG. 9 shows a detection unit 2 of the dose rate measuring device 1A according to Embodiment 2. In FIG. 9, the same or equivalent portions as those in FIG. 2 are denoted by the same reference numerals and signs, and thus the description thereof will not be given. The scintillation fiber detector 27 is installed at a position where the incidence of radiation on the scintillator 211 of the scintillation detector 21 is not blocked.

The band-like scintillation fibers 271a and 271b and the scintillation fiber 271c which is not shown are connected to optical fibers 272a and 272b and an optical fiber 272c which is not shown, respectively. The respective scintillation fibers 271 are installed at equal intervals centered on a central axis Z of the scintillation detector 21, and at equal angles with respect to a plane which is at a right angle to the central axis Z.

Further, similarly to Embodiment 1, the sum of sensitive areas of all the three band-like scintillation fibers 271a, 271b, and 271c in a central axis direction and each sensitive area in a right angle direction are substantially equal to each other, and thus the directional dependence of sensitivity on a measurement space of the scintillation fiber detector 27 is suppressed.

A light-shielding filter case 277 shields the entire scintillation fiber detector 27, and electrically shields the detector. Further, similarly to the filter plate 23 (see FIG. 2) provided in the semiconductor detector 22 of Embodiment 1, the light-shielding filter case 277 has an action of attenuating the counting rate of a pulse string of an analog voltage pulse of the scintillation fiber detector 27 so as to be approximately proportional to a dose rate without depending on energy of radiation.

The configurations and operations of low-range dose rate calculation means, high-range dose rate calculation means, and energy compensation factor determination means in the dose rate measuring device 1A according to Embodiment 2 are the same as those in Embodiment 1, and thus the description thereof will not be given.

According to Embodiment 2, one scintillation fiber detector 27 is used instead of three semiconductor detectors 22 as the second radiation detector in addition to the same effect as that in Embodiment 1, and thus the simplification of the device is achieved.

Embodiment 3

Figures 10, 11:
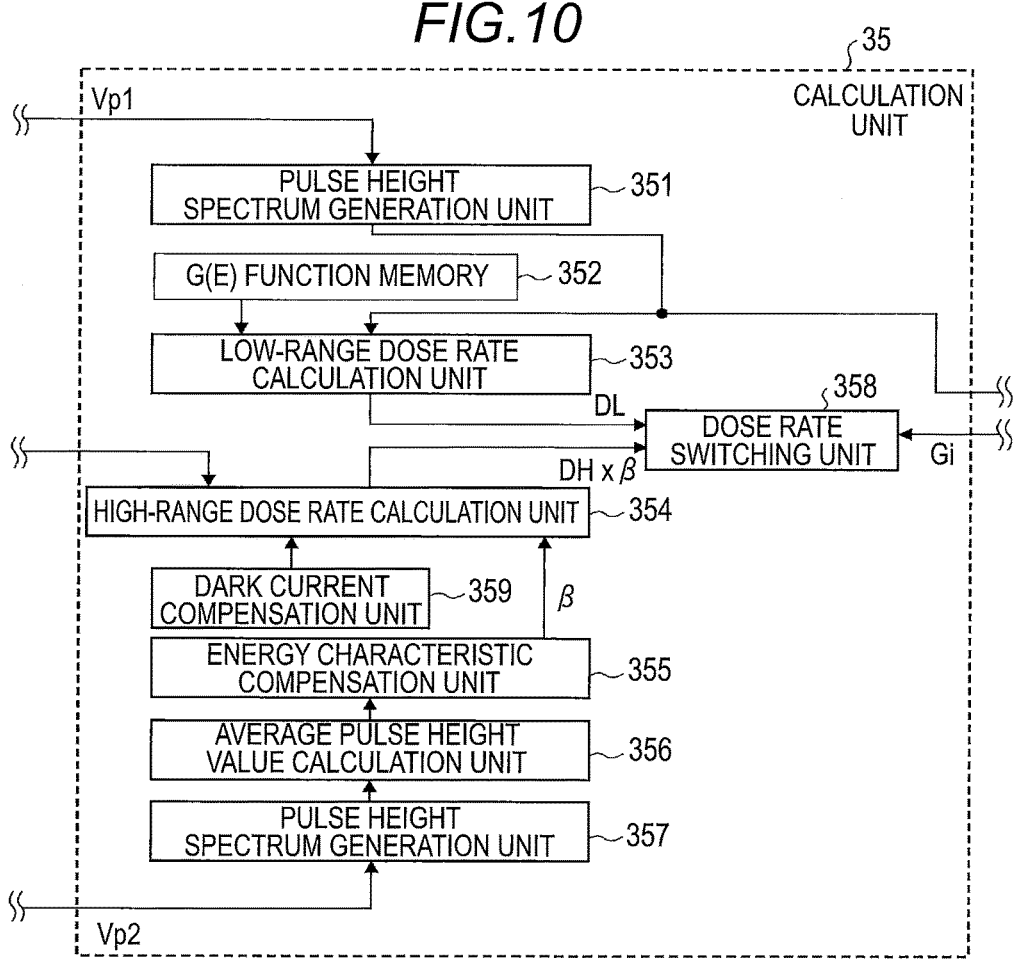
FIG. 10 is a diagram illustrating a calculation unit of a dose rate measuring device according to Embodiment 3 of the invention.
FIG. 11 is a diagram illustrating a look-up table of a high voltage and a dark current dose rate in the dose rate measuring device according to Embodiment 3 of the invention.

FIG. 10 shows a configuration of a calculation unit of a dose rate measuring device according to Embodiment 3 of the invention. The dose rate measuring device according to Embodiment 3 has the same configuration and operation as those in Embodiment 1 or Embodiment 2, except that a dark current compensation unit 359 which is dark current compensation means of the scintillation detector 21 is included in the calculation unit 35 of the measurement unit 3, and thus the description thereof will be given herein with reference to FIG. 1.

The dark current compensation unit 359 obtains a dark current of the scintillation detector 21 on the basis of a high voltage setting value of the high-voltage power supply 40 that supplies a high voltage to the scintillation defector 21, and calculates a dark current dose rate equivalent to the dark current. The setting of the high-voltage power supply 40 is performed from the display and operation unit 36.

Normally, a high voltage VH of an output of the high-voltage power supply 40 is used in a range of 700 V to 1,000 V. A logarithm of a change in the high voltage VH of this range and a logarithm of a change in the dark current Id of an output of the scintillation detector 21 are approximately proportional to each other, and the dark current Id exponentially increases with an increase in the high voltage VH. In a periodic inspection, the gain adjustment of the scintillation detector 21 is performed by adjusting the high voltage VH as necessary, but the adjustment range of the high voltage VH in the entire period of use until device update is approximately 100 V to 150 V.

In Embodiment 3, a relationship between the high voltage VH and the dark current Id is measured for each scintillation detector 21 in a use range of 700 V to 1,000 V of the high voltage VH, and a look-up table as shown in FIG. 11 is created. The look-up table is input from the display and operation unit 36, and is stored in the dark current compensation unit 359. In addition, in a case where the high voltage VH is set from the display and operation unit 36, a corresponding dark current Id is output from the dark current compensation unit 359.

An example of the look-up table of the high voltage VH and the dark current dose rate is shown in FIG. 11. In this example, the dark current dose rate for the high voltage VH at reference temperature is set to Ds, and a dark current dose rate D for the high voltage VH is obtained by an experiment or analysis in the upper limit and lower limit of a use range of 700 V to 1,000 V of the high voltage VH, and a plurality of points divided therebetween, The high-range dose rate calculation unit 354 compensates for energy characteristics by multiplying the high-range dose rate DH, obtained by a direct-current voltage which is output from the scintillation detector 21, by the energy compensation factor β acquired from the energy characteristic compensation unit 355, and then outputs a high-range dose rate (DH×β−D) obtained by subtracting the dark current dose rate D acquired from the dark current compensation unit 359.

According to Embodiment 3, since the dark current dose rate of the scintillation detector 21 included in the high-range dose rate is compensated for, in addition to the same effects as those in Embodiment 1 and Embodiment 2, it is possible to enhance the accuracy of measurement in the vicinity of the lower limit range of the high-range dose rate, and to obtain more satisfactory linearity throughout the entire measurement range. Thereby, it is possible to enhance the output energy characteristics of the low-range dose rate calculation unit 353 and the high-range dose rate calculation unit 354 in the vicinity of the switching point.

Embodiment 4

Figure 12:
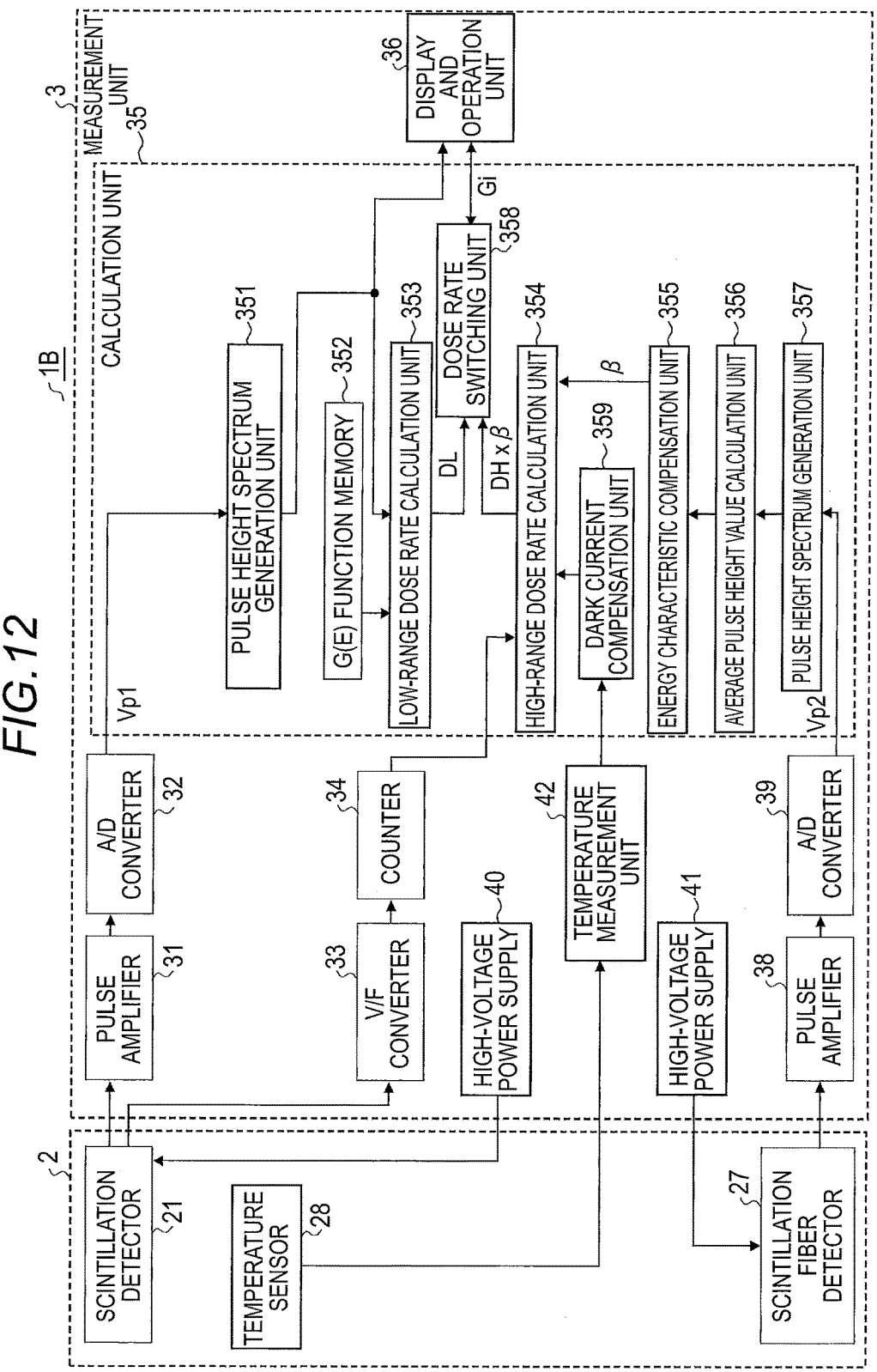
FIG. 12 is a diagram illustrating the entire configuration of a dose rate measuring device according to Embodiment 4 of the invention.

FIG. 12 shows the entire configuration of a dose rate measuring device according to Embodiment 4 of the invention. A dose rate measuring device 1B according to Embodiment 4 includes a temperature sensor 28 that detects the temperature of a measurement space having the scintillation detector 21 installed therein and outputs a temperature signal, in the detection unit 2. In addition, the measurement unit 3 includes a temperature measurement unit 42 that outputs a measured temperature on the basis of the temperature signal which is output from the temperature sensor 28, and the same dark current compensation unit 359 as that of Embodiment 3.

In Embodiment 3,the dark current dose rate of the scintillation detector 21 is obtained on the basis of the high voltage setting value of the high-voltage power supply 40, but the dose rate measuring device 1B according to Embodiment 4 obtains a dark current dose rate depending on the temperature of the scintillation detector 21, and thus improves the accuracy of a dark current dose rate which is excluded from the high-range dose rate.

Other configurations of the dose rate measuring device 1B are the same as those of the close rate measuring device 1A (see FIG. 7) according to Embodiment 2,and thus the description thereof will not be given. A method of obtaining a dark current dose rate depending on the temperature of the scintillation detector 21 according to Embodiment 4 can also be applied to the dose rate measuring device 1 (see FIG. 1) according to Embodiment 1.

The dark current compensation unit 359 obtains a dark current of the scintillation detector 21 on the basis of the temperature which is output from the temperature measurement unit 42 and the high voltage setting value of the high-voltage power supply 40, and calculates a dark current dose rate D equivalent to the dark current. Specifically, the dark current compensation unit 359 substitutes the temperature T(° C.) of the scintillation detector 21 which is output from the temperature measurement unit 42 into the following Expression 1,and obtains an absolute temperature Ta.

$$Ta = T + 273 (K) \quad \text{(Expression 1)}$$

Next, the absolute temperature Ta is substituted into the following Expression 2 indicating a relationship between a dark current and a temperature which axe generally known in the field of a photomultipiier tube, and a dark current I(T) depending on temperature is obtained. E and Q are constants which are determined by a photomuitipiier tube. E is relevant to a work function of the photoelectric surface of the photomuitipiier tube, and is obtained on the basis of shipping test data of a photomuitipiier tube maker.

$$I(T) = Q(Ta)^{5/4} \exp(-E/Ta) \quad \text{(Expression 2)}$$

The dark, current compensation unit 359 obtains a ratio of the dark current Id to the dark current I(T) depending on temperature in the condition of a reference temperature To and the high voltage setting value, that is, Id/I(T), and multiplies the dark current dose rate D (see FIG. 11) shown in Embodiment 3 by the ratio. Thereby, a dark current dose rate in which temperature characteristics are reflected is obtained.

The high-range dose rate calculation unit 354 compensates for the energy characteristics by multiplying the high-range dose rate, obtained by the direct-current voltage which is output from the scintillation detector 21, by the energy compensation factor acquired from the energy characteristic compensation unit 355, and then outputs a high-range dose rate obtained by subtracting the dark current dose rate in which the temperature characteristics acquired, from the dark current compensation unit 359 are reflected.

According to Embodiment 4, since the dark current dose rate in which the temperature characteristics are reflected in the high-range dose rate calculation unit 354 is compensated for, in addition to the same effects as those in Embodiment 1 to Embodiment 3, a net high-range dose rate from which the dark current is excluded more accurately can be obtained, and the accuracy of measurement of the high-range dose rate is improved.

Embodiment 5

Figure 13:
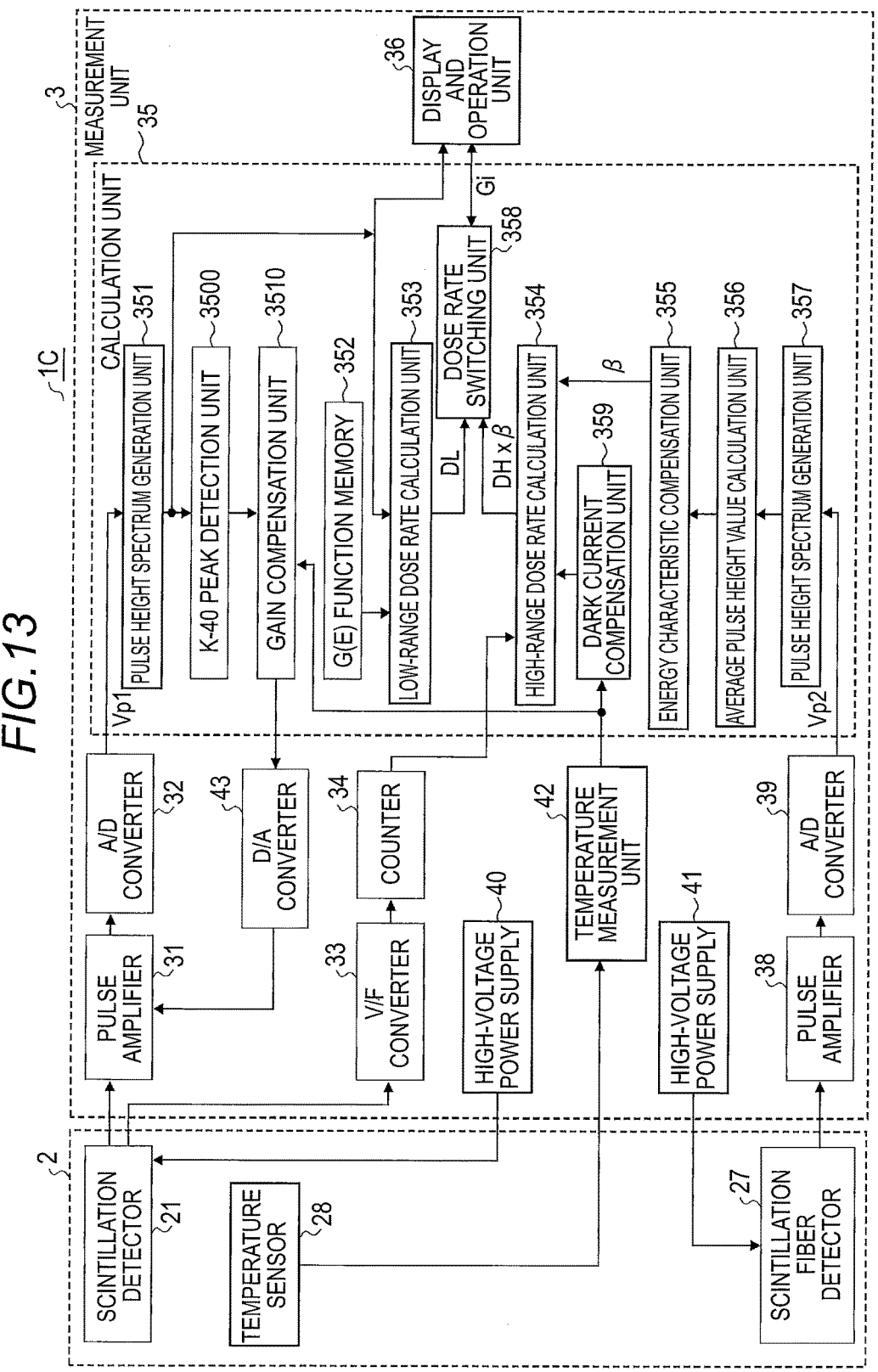
FIG. 13 is a diagram illustrating the entire configuration of a dose rate measuring device according to Embodiment 5 of the invention.

FIG. 13 shows the entire configuration of a dose rate measuring device according to Embodiment 5 of the invention. A dose rate measuring device IC according to Embodiment 5 detects a spectrum peak of a natural radionuclide K-40 included in the configuration material of the scintillation detector 21 on the basis of the first pulse height spectrum, and compensates for a shift of the spectrum peak from a reference position, to thereby compensate for the temperature dependence of the low-range dose rate and a drift of the photomultiplier tube 212.

The dose rate measuring device IC according to Embodiment 5 includes a digital/analog converter 43 (hereinafter, referred to as a D/A converter 43) installed in the measurement unit 3, and a K-40 peak detection unit 3500 and a gain compensation unit 3510 which are added to the calculation unit 35, as gain compensation means. In addition, the device includes the temperature sensor 28 and the temperature measurement unit 42 which are the same as those in Embodiment 4.

Other configurations of the dose rate measuring device 1C are the same as those of the dose rate measuring device 1B (see FIG. 12) according to Embodiment 4,and thus the description thereof will not be given. The gain compensation means according to Embodiment 5 can also be applied to the dose rate measuring device 1 (see FIG. 1) according to Embodiment 1.

Figure 14:
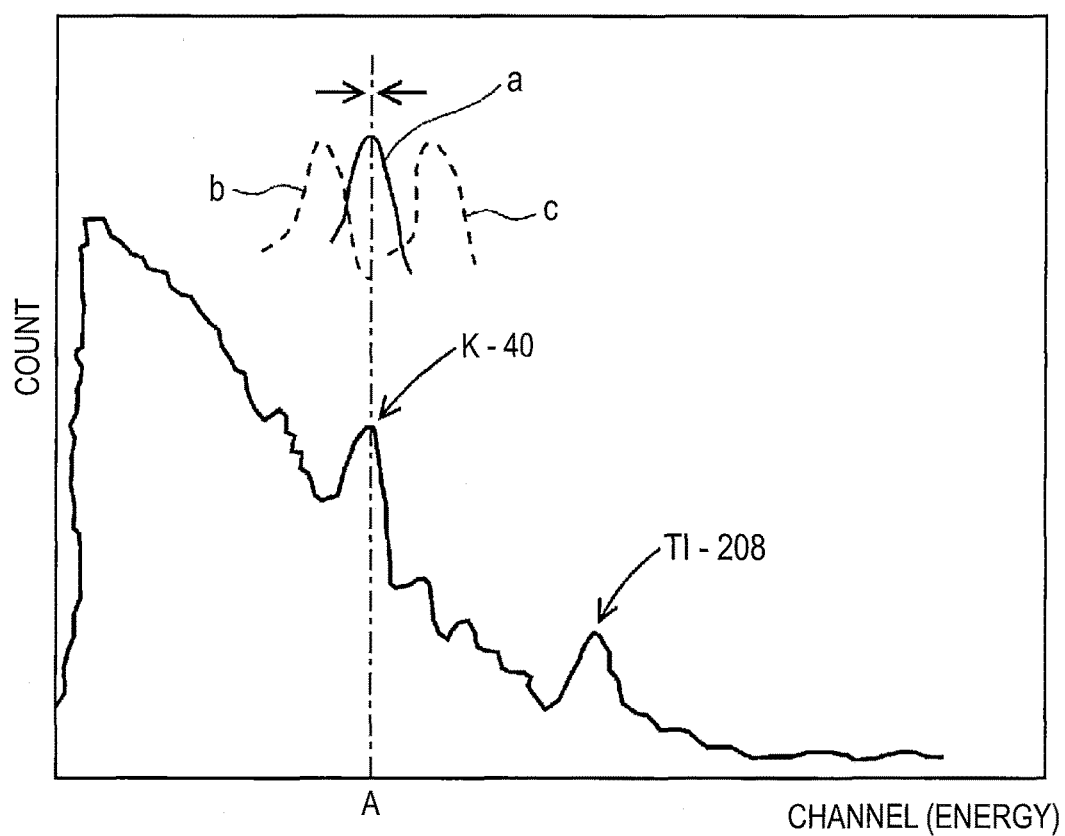
FIG. 14 is a diagram illustrating a gain drift compensation operation in a low dose rate region of a scintillation detector according to Embodiment 5 of the invention.

The gain drift compensation operation of the scintillation detector 21 in a low dose rate region will be described with reference to FIG. 14. FIG. 14 shows a count in each channel based on spectrum data of the first pulse height spectrum, the horizontal axis is a channel, and the vertical axis is a count. In the drawing, a shows a case where the peak of K-40 is located at a reference position A, b shows a case where the peak is lower than the reference position, and c shows a case where the same peak is higher than the reference position. In a case where the gain compensation means is not present, the peak of K-40 fluctuates like b or c.

The K-40 peak detection unit 3500 detects a spectrum peak of the natural radionuclide K-40 included in the configuration material of the scintillation detector 21, on the basis of the first pulse height spectrum acquired from the pulse height spectrum generation unit 351, and analyzes a peak pulse height value of K-40.

The gain compensation unit 3510 compensates for a shift of the spectrum peak of K-40 from the reference position and. determines a gain required for returning the spectrum peak to the reference position, on the basis of the temperature acquired from the temperature measurement unit and the detection result of the spectrum peak of K-40 acquired from the K-40 peak detection unit 3500. The D/A converter 43 converts data which is output from the gain compensation unit 3510 into a voltage, and outputs the converted voltage to the pulse amplifier 31 to set a gain. The accuracy of detection of the peak position of K-40 depends on the number of peak counts. In addition, the fluctuation of the peak position depends on temperature in the short term, and depends on a gain drift of the photomultiplier tube 212 in the long term. Therefore, a problem does not occur by continuously performing temperature compensation and intermittently performing gain compensation based on the detection of the peak position of K-40.

According to Embodiment 5,since the gain compensation means is included in the measurement unit 3, and the temperature dependence of the low-range dose rate and a drift of the photomultiplier tube 212 are compensated for, in addition to the same effects as those in Embodiment 1 to Embodiment 4, the accuracy of measurement in a low dose rate region requiring high stability is improved. In the invention, the respective embodiments can be freely combined or the respective embodiment can be appropriately modified and omitted, within the scope of the invention.

INDUSTRIAL APPLICABILITY

The invention can be used in a dose rate measuring device which is installed in the vicinity of facilities such as a nuclear facility.

The invention claimed is:

1. A dose rate measuring device comprising:
a detection unit including first radiation detector for detecting radiation and outputting an analog voltage pulse and a direct-current voltage, and second radiation detector for detecting radiation in three or more sensor units and outputting analog voltage pulses; and
a measurement unit including a calculator to convert a first pulse height spectrum, obtained by the analog voltage pulse which is output from the first radiation detector, into a low-range dose rate, and to convert the direct-current voltage, which is output from the first radiation detector, into a high-range dose rate, and to determine an energy compensation factor for the high-range dose rate on the basis of an average pulse height value obtained from a second pulse height spectrum obtained by the analog voltage pulses which are output from the second radiation detector, and to multiply the high-range dose rate by the energy compensation factor, and to compensate for energy characteristics of the high-range dose rate,
wherein the respective sensor units of the second radiation detector are installed at positions where incidence of radiation on the first radiation detector is not blocked, at equal intervals centered on a central axis of the first radiation detector and at equal angles with respect to a plane which is at a right angle to the central axis, and are disposed so that a sum of areas seen through sensitive surfaces of the respective sensor units from a direction parallel to the central axis, and areas seen through the sensitive surfaces of the respective sensor units from a direction at a right anqle to the central axis become equal to each other.

2. The dose rate measuring device according to claim 1, wherein the calculator obtains a ratio of the high-range dose rate obtained by compensating for the energy characteristics to the low-range dose rate, and switch and output the low-range dose rate and the high-range dose rate obtained by compensating for the energy characteristics, on the basis of the ratio and the high-range dose rate obtained by compensating for the energy characteristics.

3. The dose rate measuring device according to claim 1, wherein a semiconductor detector in which the sensor unit is a semiconductor sensor is used as the second radiation detector.

4. The dose rate measuring device according to claim 1, wherein a scintillation fiber detector in which the sensor unit is a scintillation fiber is used as the second radiation detector.

5. The dose rate measuring device according to claim 1, wherein the calculator inputs the first pulse height spectrum in a fixed period to convert a pulse height into a dose rate, and obtains the low-range dose rate from an average dose rate obtained by a moving average.

6. The dose rate measuring device according to claim 1, wherein the calculator inputs a count value obtained by counting a digital pulse of a repetitive frequency directly proportional to the direct-current voltage which is output from the first radiation detector to convert the count value into a dose rate, and obtains the high-range dose rate from the average dose rate obtained by a moving average.

7. The dose rate measuring device according to claim 1, wherein the calculator obtains a dark current of the first radiation detector on the basis of a high voltage setting value of high voltage power supply for supplying a high voltage to the first radiation detector, and calculates a dark current dose rate equivalent to the dark current, and
multiplies the high-range dose rate by the energy compensation factor, and then subtracts the dark current dose rate to compensate for the energy characteristics of the high-range dose rate and the dark current.

8. The dose rate measuring device according to claim 7, wherein the detection unit includes a temperature sensor that detects a temperature of a space having the first radiation detector installed therein and outputs a temperature signal, the measurement unit includes a temperature measurement unit that outputs the temperature measured on the basis of the temperature signal which is output from the temperature sensor, and the calculator obtains the dark current of the first radiation detector on the basis of the temperature which is output from the temperature measurement unit and the high voltage setting value of the high voltage power supply, and calculates the dark current dose rate equivalent to the dark current.

9. The dose rate measuring device according to claim 1, wherein the detection unit includes the temperature sensor that detects a temperature of a space having the first radiation detector installed therein and outputs a temperature signal, and the measurement unit includes the temperature measurement unit that outputs the temperature measured on the basis of the temperature signal which is output from the temperature sensor, the calculator detects a spectrum peak of a natural radionuclide K-40 included in a configuration material of the first radiation detector on the basis of the first pulse height spectrum, and determines a gain for compensating for a shift of the spectrum peak of K-40 from a reference position, on the basis of the temperature acquired from the temperature measurement unit and a detection result of the spectrum peak of K-40.

* * * * *